(12) United States Patent
Ngo et al.

(10) Patent No.: US 9,921,313 B2
(45) Date of Patent: Mar. 20, 2018

(54) GLOBAL POSITIONING SYSTEM PHASED ARRAY USING ALL-DIGITAL BEAM FORMING AND DIRECT DIGITAL WAVEFORM SYNTHESIS METHODS

(71) Applicant: Northrop Grumman Systems Corporation, Falls Church, VA (US)

(72) Inventors: Kiet D. Ngo, Hermosa Beach, CA (US); Edward V. Koretzky, Hawthorne, CA (US); Dennis M. Hall, Manhattan Beach, CA (US); Douglas S. Cockfield, Carson, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 602 days.

(21) Appl. No.: 14/302,663

(22) Filed: Jun. 12, 2014

(65) Prior Publication Data
US 2015/0364819 A1 Dec. 17, 2015

(51) Int. Cl.
*G01S 19/02* (2010.01)
*H01Q 3/30* (2006.01)
(Continued)

(52) U.S. Cl.
CPC .............. *G01S 19/02* (2013.01); *H01Q 3/30* (2013.01); *H01Q 21/0093* (2013.01); *G01S 1/042* (2013.01)

(58) Field of Classification Search
CPC .......... G01S 19/35; G01S 19/36; G01S 19/37; G01S 19/02; G01S 19/11; H01Q 21/06; H01Q 21/061; H01Q 21/067
See application file for complete search history.

(56) References Cited

U.S. PATENT DOCUMENTS

| 5,764,187 A | 6/1998 | Rudish et al. |
| 5,943,010 A * | 8/1999 | Rudish ............... H01Q 3/24 342/154 |

(Continued)

OTHER PUBLICATIONS

Liegeon, Emmanuel. Galileo NSGU. Third Edition of the Microelectronic Presentation Days, Alcatel Alenia Space , 2005, pp. 1-14.*

(Continued)

*Primary Examiner* — Gregory C. Issing
(74) *Attorney, Agent, or Firm* — Patti & Malvone Law Group, LLC

(57) ABSTRACT

An apparatus includes: a Global Positioning System (GPS) phased array comprising a plurality of digital beam forming elements (DBFEs), wherein at least one of the DBFEs includes: an antenna configured to transmit a GPS signal; a radio frequency (RF) electronics section operably connected to the antenna and digital electronics sections; and a digital electronics section operably connected to the RF electronics section. An apparatus includes: a GPS phased array comprising a plurality of DBFEs, wherein at least one of the DBFEs includes: an antenna configured to transmit a GPS signal; an RF electronics section operably connected to the antenna and digital electronics sections; and a digital electronics section operably connected an RF electronic section; a navigation encoder and frequency generator (NEFU) unit operably connected to the GPS phased array; and an atomic frequency standard operably connected to the NEFU unit.

21 Claims, 9 Drawing Sheets

(51) Int. Cl.
*H01Q 21/00* (2006.01)
*G01S 1/04* (2006.01)

(56) References Cited

U.S. PATENT DOCUMENTS

| | | | | |
|---|---|---|---|---|
| 6,335,951 | B1* | 1/2002 | Cangiani | H04L 27/362 |
| | | | | 342/357.395 |
| 6,362,790 | B1* | 3/2002 | Proctor, Jr. | H01Q 1/22 |
| | | | | 343/702 |
| 6,388,512 | B1 | 5/2002 | Simms, III | |
| 6,828,935 | B1 | 12/2004 | Dunn et al. | |
| 6,856,284 | B1* | 2/2005 | Cangiani | H01Q 1/288 |
| | | | | 342/154 |
| 6,917,329 | B2* | 7/2005 | Dougherty | G01S 19/29 |
| | | | | 342/357.48 |
| 7,345,629 | B2* | 3/2008 | Dulmovits, Jr. | H01Q 21/0006 |
| | | | | 342/372 |
| 8,558,735 | B2 | 10/2013 | Bachmann et al. | |
| 2003/0072385 | A1* | 4/2003 | Dragonetti | H04L 5/04 |
| | | | | 375/295 |
| 2006/0125687 | A1* | 6/2006 | Greeley | H01Q 3/26 |
| | | | | 342/368 |

OTHER PUBLICATIONS

Coromina, F. et al. "On-board Applications of Active Microwave Technologies to Galileo and other European Space Programs." 12th GAAS Symposium, Amsterdam, 2004, pp. 607-614.*
Burbidge, G.T.A. "Development of the Navigation Payload for the Galileo In-Orbit Validation (IOV) Phase." IGNSS Symposium 2007. pp. 1-15.*
Freuhauf, Hugo. "GPS Basics to GNSS Future." 2008, pp. 1-49.*
Wannamaker, R. A. et al; A Theory of Nonsubtractive Dither; IEEE Transactions on Signal Processing, IEEE Service Center, New York, NY, US; vol. 48, No. 2, Jan. 1, 2000; XP011058867; ISSN: 1053-587X.
Ramakrishnan, S. et al; Modelling the Galileo Full Operational Capability (FOC) Transmit Antenna and its Impat on Future Space Missions; ITM 2014—Proceedings of the 2014 International Technical Meeting of the Institute of Navigation, The Institute of Navigation, 8551 Rixlew Lane, Suite 360, Manassas, VA 20109; USA; Jan. 29, 2014; pp. 813-824; XP056008147.
Wolfrum, J. et al; Galileo—Europe's Contribution to the Next Generation of GNSS; GPS 1999—Proceedings of the 12th International Technical Meeting of the Satellite Division of the Institute of Navigation (ION GPS 1999); the Institute of Navigation; 8551 Rixlew Lane, Suite 360, Manassas, VA 20109; USA; Sep. 17, 1999; pp. 1381-1390; XP056003073.
Bhat, A. et al; Software defined, Plug-and-Play (PNP) Radar Transceiver for phased-array applications; Antennas and Propagation Society International Symposium (APSURSI), 2012 IEEE , p. 1-2; Jul. 8-14, 2012.
Cebrian, J.M. et al.; ADIBEAM: Design and experimental validation of a robust beamforming platform for Galileo reference ground stations; Satellite Navigation Technologies and European Workshop on GNSS Signals and Signal Processing (NAVITEC), 2010 5th ESA Workshop on, p. 1-8; Dec. 8-10, 2010.
Dobychina, E.M. et al; Digital transceiver module of the intelligent antenna array; Microwave and Telecommunication Technology (CriMiCo), 2013 23rd International Crimean Conference, pp. 638-639; Sep. 8-14, 2013.
Lopez-Dekker, P. et al; Instrument architecture, advanced digital beamforming techniques, and operation modes for an enhanced signal mission concept; Geoscience and Remote Sensing Symposium (IGARSS), 2013 IEEE International, pp. 3475-3478, Jul. 21-26, 2013; doi: 10.1109/IGARSS.2013.6723577.
Sotiriadis, P.P. et al; Single-Bit Digital Frequency Synthesis via Dithered Nyquist-Rate Sinewave Quantization; Circuits and Systems I: Regular Papers, IEEE Transactions on; vol. 61, No. 1, pp. 61-73, Jan. 2014.
Wang, Xin-Huai et al; Smart antenna design for GPS/GLONASS anti-jamming using adaptive beamforming; Microwave and Millimeter Wave Technology (ICMMT), 2010 International Conference on, pp. 1149-1152; May 8-11, 2010.

* cited by examiner

GLOBAL POSITIONING SYSTEM PHASED ARRAY USING ALL-DIGITAL BEAM FORMING AND DIRECT DIGITAL WAVEFORM SYNTHESIS METHODS

SUMMARY

An apparatus includes: a Global Positioning System (GPS) phased array comprising a plurality of digital beam forming elements (DBFEs), wherein at least one of the DBFEs includes: an antenna configured to transmit a GPS signal; a radio frequency (RF) electronics section operably connected to the antenna; and a digital electronics section operably connected to the RF section.

An apparatus includes: a GPS phased array comprising a plurality of DBFEs, wherein at least one of the DBFEs includes: an antenna configured to transmit a GPS signal; an RF electronics section operably connected to the antenna; and a digital electronics section operably connected to the RF section; a navigation encoder and frequency generator (NEFU) unit operably connected to the GPS phased array; and an atomic frequency standard operably connected to the NEFU unit.

An apparatus includes: a GPS phased array comprising a plurality of DBFEs, wherein at least one of the DBFEs includes: an antenna configured to transmit a GPS signal; an RF electronics section operably connected to the antenna, wherein the RF electronics section includes: one or more digital amplifiers; one or more filters operably connected to at least one of the one or more digital amplifiers, and an analog combiner operably connected to at least one of the one or more filters; and a digital electronics section operably connected to the RF section, wherein the digital electronics section includes: a digital application-specific integrated circuit (ASIC), wherein the ASIC includes one or more of a digital waveform generator, a quantization unit configured to perform N-bit quantization, and a dithering unit configured to generate pseudo-random noise (PRN) codes; and a digital multiplexer operably connected to the ASIC; a NEFU unit including: a navigation data repository operably connected to the ASIC; and a frequency synthesizer operably connected to the ASIC; and an atomic frequency standard operably connected to the frequency synthesizer.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

DETAILED DESCRIPTION

Figure 1:
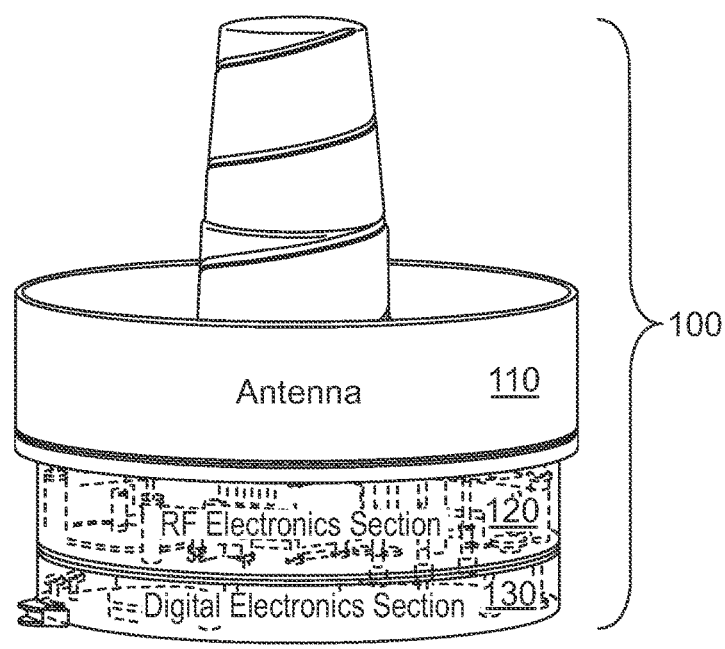
FIG. 1 is a drawing of a digital beam forming element (DBFE).

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

This approach will provide a more robust and tolerant architecture achieving on-orbit reconfigurable signals with greater stability.

According to embodiments of the invention, a Global Positioning System (GPS) payload may be enhanced with a phased array using all-digital generation, distributed over a phased array aperture, of position, navigation, and time (PNT) signals.

According to other embodiments of the invention, conversion of N-bit quantized data for synthesis and amplification of the GPS signals leads to a high-efficiency digital architecture for the generation and transmission of the GPS waveforms. According to other embodiments of the invention, the signal generation is digital until the signal reaches one or more bandpass filters, which convert the signal to analog form.

Further embodiments of the invention provide a robust and tolerant architecture for achieving on-orbit reconfigurable signals with greater stability. According to still other embodiments of the invention, a phased array of a plurality of digital beam forming elements (DBFEs)—operating under the control of a navigation encoder and frequency generator unit (NEFU)—allows the faithful reproduction of multiple phase shift keying (MPSK) and other non-constant envelope signals. According to still further embodiments of the invention, the DBFEs integrate an antenna with electronics comprising one or more of digital, RF, and DC components.

FIG. 1 is a drawing of a DBFE 100. The DBFE 100 comprises an antenna 110 operably connected to a radio frequency (RF) electronics section 120, which in turn is operably connected to a digital electronics section 130. Various designs were evaluated for the antenna 110, with a helix aperture appearing to provide the best compromise between size, mass, and performance.

Figure 2:
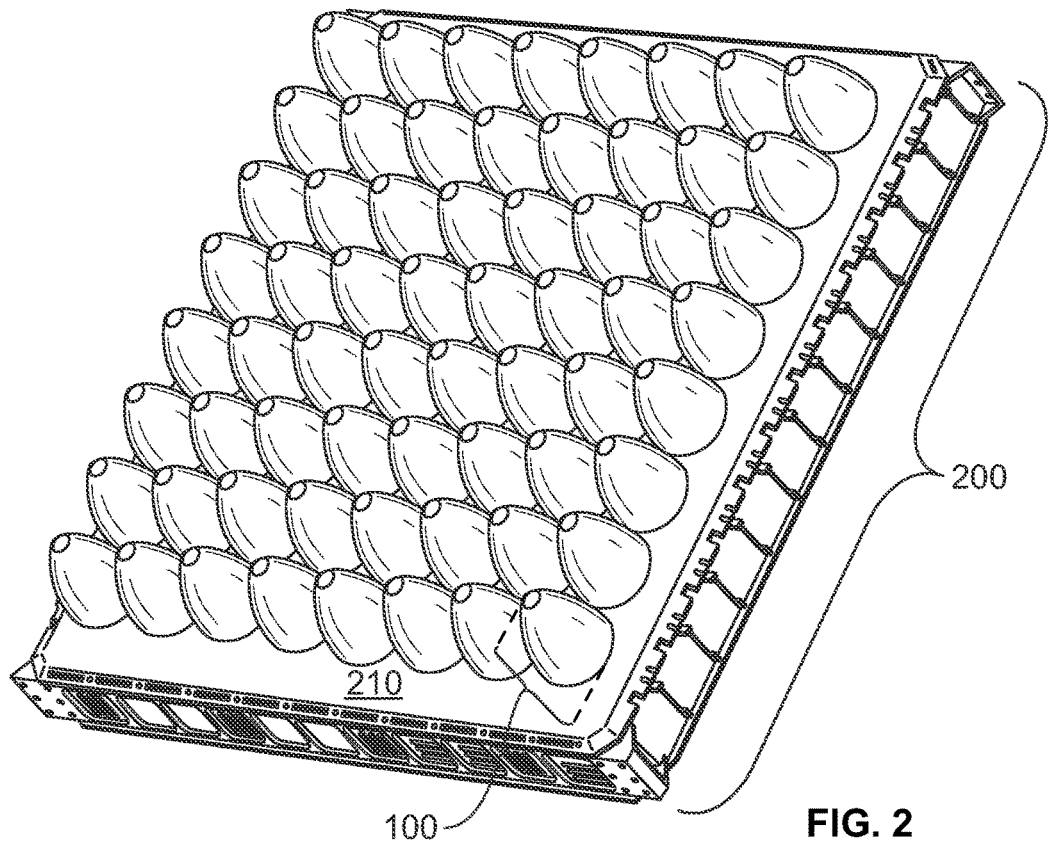
FIG. 2 is a drawing of a phased array of DBFE's comprising wideband conical notch apertures arranged in the phased array panel.

FIG. 2 is a drawing of a phased array 200 of DBFE's 100 comprising wideband conical notch apertures as in FIG. 1, arranged in the phased array panel 210 that is approximately one square meter in size and approximately 30 centimeters in thickness. Phased arrays 200 comprising various numbers of DBFE's 100 were tried and the number twenty-seven of DBFE's 100 was found to provide good results, nicely populating the area of the phased array panel 210 and providing healthy specifications, adequate spatial resolution for a spot beam, and sufficient power.

Figure 3:
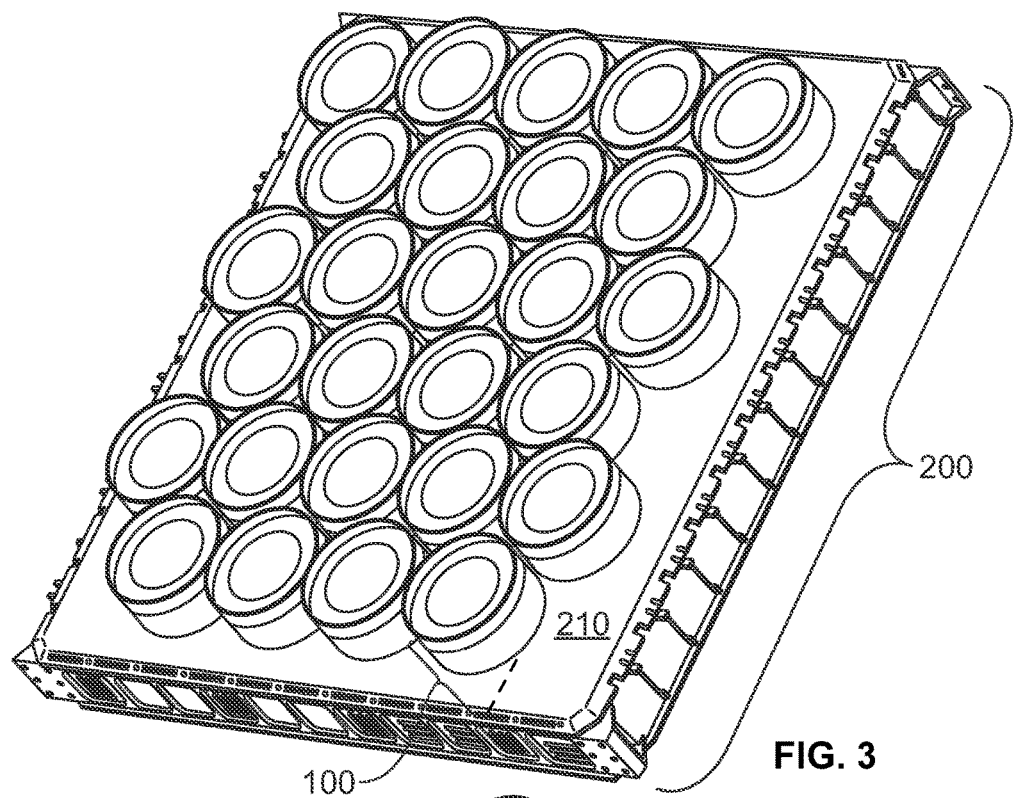
FIG. 3 is a drawing of a phased array of DBFE's comprising dual-band stacked patch apertures arranged in the phased array panel.
Figure 4:
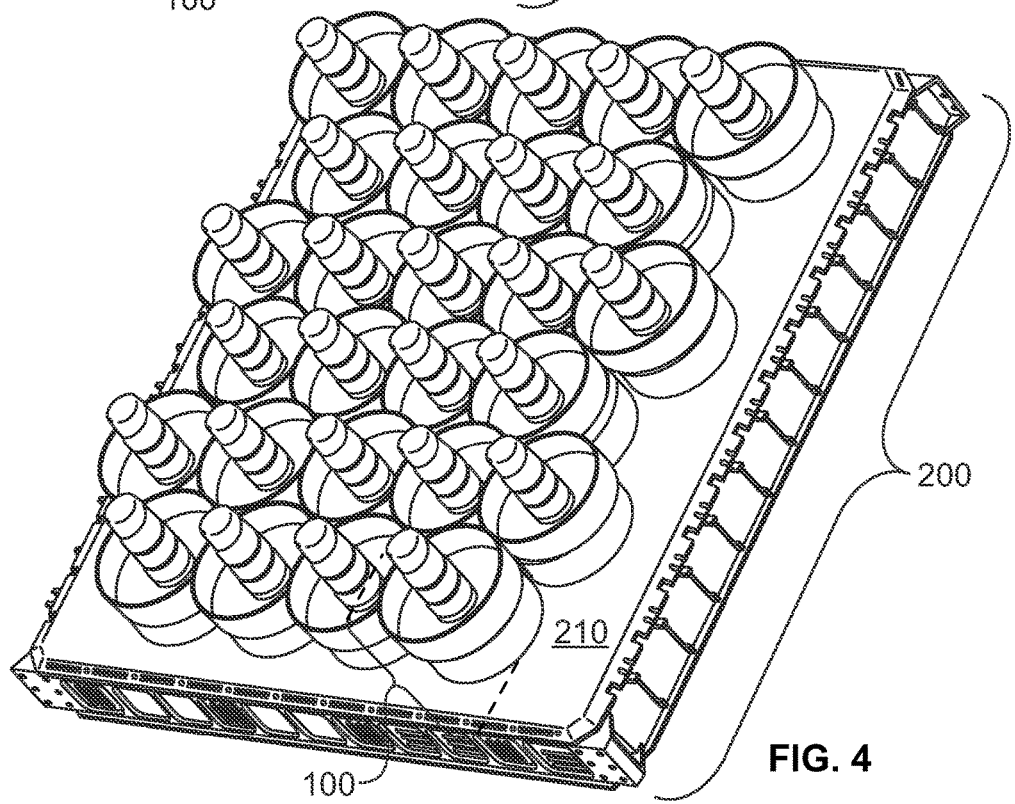
FIG. 4 is a drawing of a phased array of DBFE's comprising helical apertures arranged in the phased array panel.

FIGS. 3-4 illustrate other possible designs for the DBFE's 100 and the associated phased array panels.

FIG. 3 is a drawing of a phased array 200 of DBFE's 100 comprising dual-band stacked patch apertures arranged in the phased array panel 210.

FIG. 4 is a drawing of a phased array 200 of DBFE's 100 comprising helical apertures arranged in the phased array panel 210.

Figure 5:
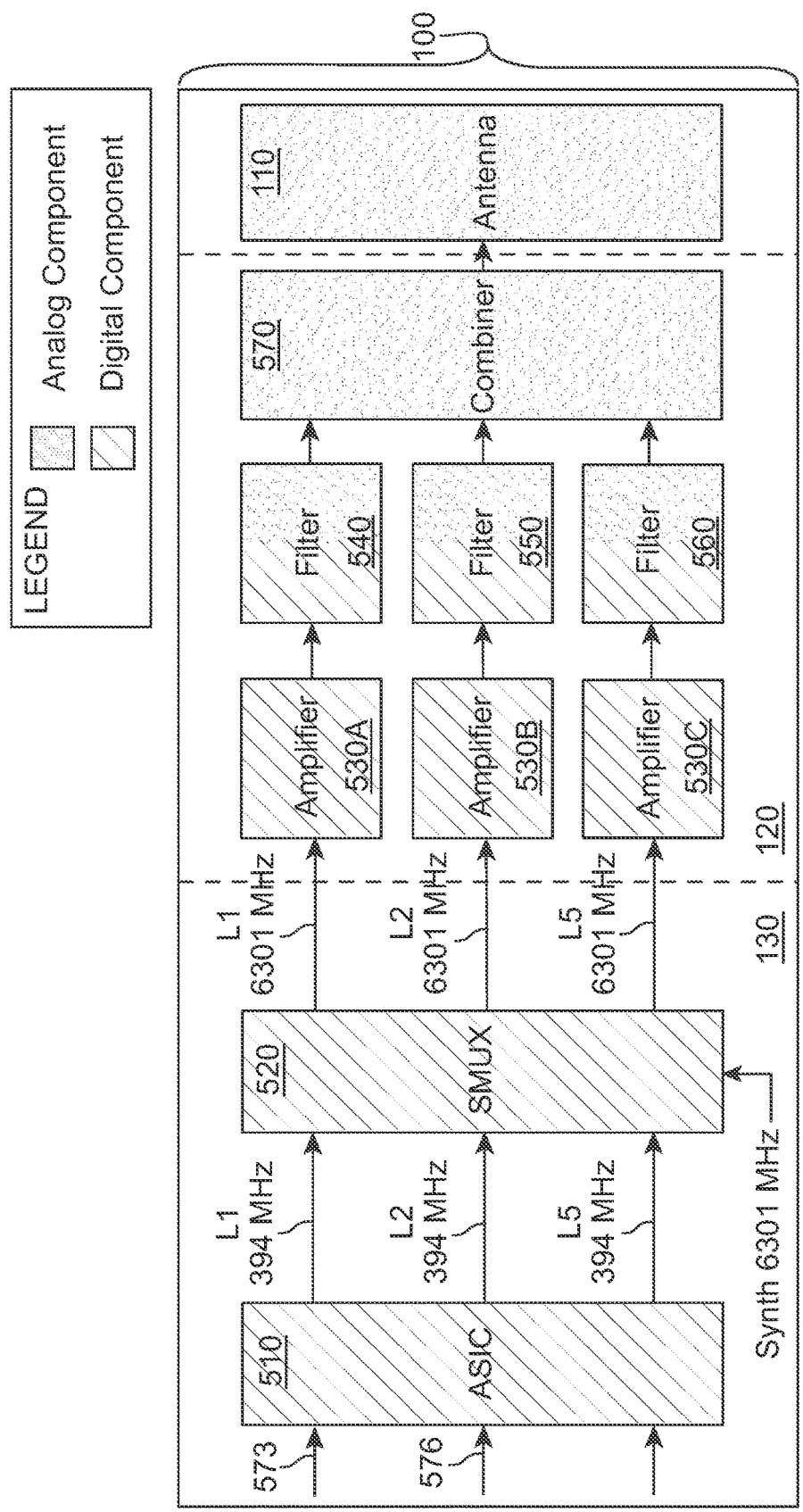
FIG. 5 is a block diagram of the architecture of a DBFE.

FIG. 5 is a block diagram of the architecture of a DBFE 100. FIG. 5 includes a legend according to which the analog and digital characteristics of each component are displayed in the diagram. The DBFE 100 comprises the antenna 110, the RF electronics section 120, and the digital electronics section 130.

The digital electronics section 130 comprises a reconfigurable digital application-specific integrated circuit (ASIC) 510 and a digital multiplexer 520. The reconfigurable waveforms allow for multiple spreading codes among multiple bands, for example, allowing twelve spreading codes among three bands.

The RF electronics section 120 comprises one or more digital amplifiers 530, a first filter 540, a second filter 550, a third filter 560, and an analog combiner 570. One or more of the first filter 540, the second filter 550, and the third filter 560 converts the signal from digital to analog.

The ASIC 510 may be configured to serve as one or more of a digital waveform generator and a quantizer. Data 573 flows into the ASIC 510. Clock timing information 576 also flows into the ASIC 510. The ASIC 510 is operably connected to the multiplexer 520. The multiplexer 520 is operably connected to at least one of the one or more amplifiers 530. At least one of the one or more amplifiers 530 is operably connected to at least one of the first filter 540, the second filter 550, and the third filter 560. At least one of the first filter 540, the second filter 550, and the third filter 560 is operably connected to the combiner 570. The combiner 570 is operably connected to the antenna 110.

The multiplexer 520 may be a Simple Network Management Protocol (SMTP) Multiplexing (SMUX) unit 520. The multiplexer 520 may be a digital serializer SMUX multiplexer 520.

In FIG. 5, three amplifiers 530A, 530B, and 530C are shown. One or more of the amplifiers 530 may be solid state power amplifiers (SSPAs) 530. One or more of the amplifiers 530 may be high-efficiency switching SSPAs 530. One or more of the amplifiers 530 may comprise a direct current (DC) power converter. One or more of the amplifiers 530 may be configured to provide a high-efficiency point of load DC power converter. One or more of the amplifiers 530 may be a high efficiency, switching-mode Class D gallium nitride (GaN) power amplifier.

In FIG. 5, the first filter 540, the second filter 550, and the third filter 560 are shown. One or more of the first filter 540, the second filter 550, and the third filter 560 may comprise a bandpass filter (BPF). One or more of the first filter 540, the second filter 550, and the third filter 560 may comprise a microwave BPF. One or more of the first filter 540, the second filter 550, and the third filter 560 converts the digital signal to an analog signal.

Figure 6:
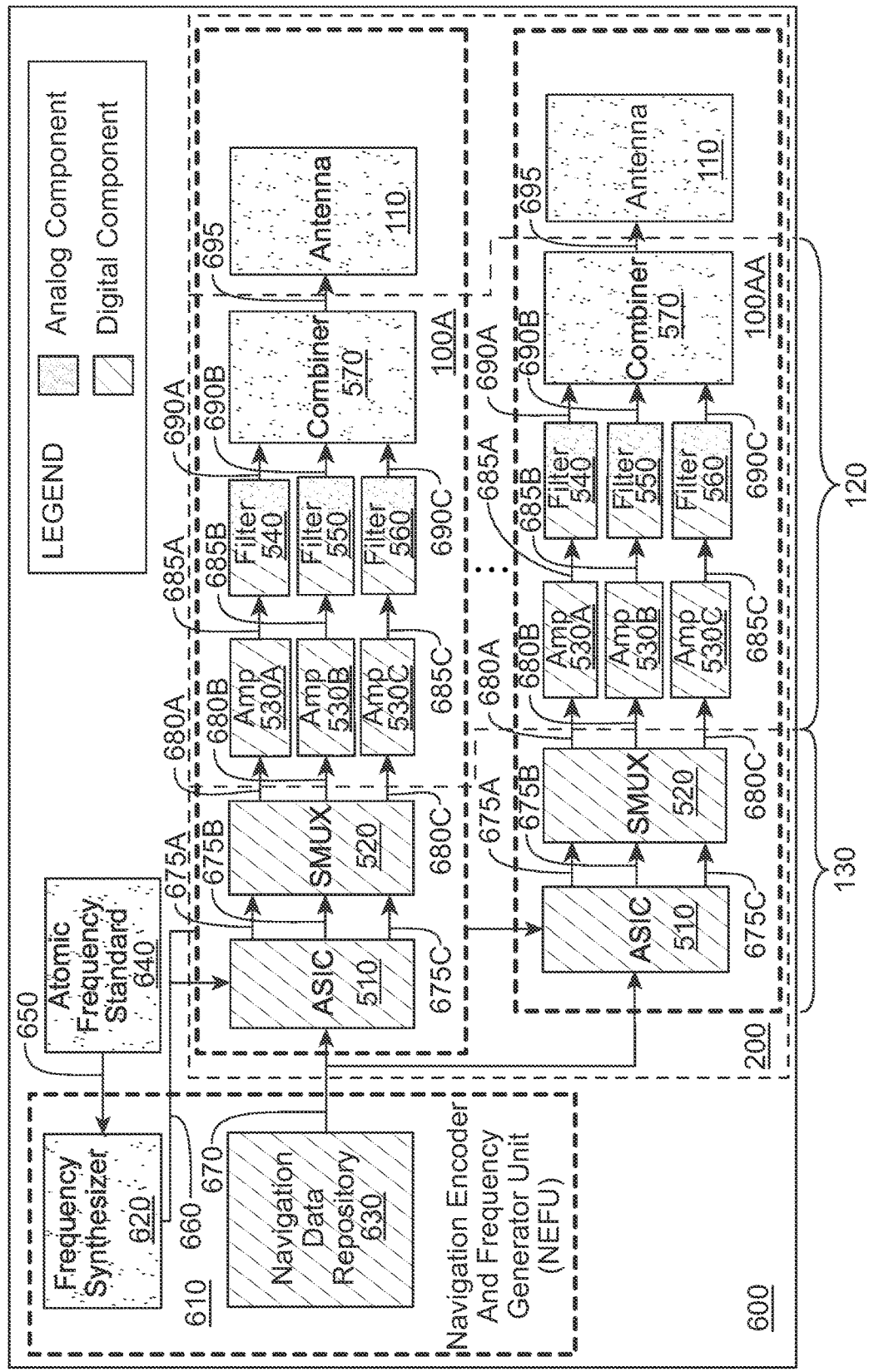
FIG. 6 is a block diagram of the architecture of an all-digital beam forming apparatus comprising a phased array of DBFE's.

FIG. 6 is a block diagram of the architecture of an all-digital beam forming apparatus 600 comprising a phased array 200 of twenty-seven DBFE's 100A, 100B ... 100AA. FIG. 6 includes a legend according to which the analog and digital characteristics of each component are displayed in the diagram.

As in FIG. 5, at least one of the DBFE's 100A, 100B ... 100AA comprises the antenna 110, the RF electronics section 120, and the digital electronics section 130. The RF electronics section 120 comprises one or more digital amplifiers 530, a first filter 540, a second filter 550, a third filter 560, and an analog combiner 570. The digital electronics section 130 comprises a reconfigurable digital application-specific integrated circuit (ASIC) 510 and a digital multiplexer 520.

At least one of the DBFE's 100A, 100B ... 100AA comprises the ASIC 510; the multiplexer 520; the one or more amplifiers 530; one or more of the first filter 540, the second filter 550, and the third filter 560; the combiner 570; and the antenna 110.

The beam-forming apparatus 600 further comprises a NEFU 610. The NEFU 610 will typically, although not necessarily, be comprised in a box that feeds the phased array 200 and is located on the payload but is not comprised in the phased array 200. Representative dimensions for the NEFU 610 are, for example, approximately one foot by approximately one foot by approximately 30 centimeters. The NEFU 610 in turn comprises one or more of a frequency synthesizer 620 and a navigation data repository 630. The frequency synthesizer is configured to multiply a reference frequency up to the desired transmitted carrier frequencies of 1,575.42 Megahertz (MHz) for L1, 1,227.6 MHz for L2, and 1,176.45 MHz for L5.

The beam-forming apparatus 600 further comprises an atomic frequency standard 640. The atomic frequency standard 640 may be configured to provide a nominal 10.23 MHz reference frequency. Alternatively, the atomic frequency standard 640 may be a voltage-controlled crystal oscillator (VCXO) atomic frequency standard 640.

The atomic frequency standard 640 is operably connected via an atomic frequency standard-frequency synthesizer connection 650 to the frequency synthesizer 620. The frequency synthesizer 620 is operably connected via one or more frequency synthesizer-ASIC connections 660 to one or more of the ASIC's 510. The navigation data repository 630 is operably connected via one or more navigation data repository-ASIC connections 670 to one or more of the ASIC's 510.

The ASIC 510 may be configured to serve as one or more of a digital waveform generator and a quantizer. The ASIC 510 is configured to add the flexibility of programmable waveform tables into which new waveforms can be uploaded on-orbit. While not as reconfigurable as field-programmable gate arrays (FPGAs), the ability to upload new waveform data from the NEFU 670 into the programmable waveform table provides significant onboard flexibility, while retaining the size, weight, and power (SWaP) benefits as well as the lower recurring costs of the ASIC 510.

The ASIC 510 receives navigation data from the navigation data repository 630 via the one or more navigation data repository-ASIC connections 670. The ASIC 510 produces oversampled data in parallel form. Alternatively, or additionally, the ASIC 510 may produce Nyquist sampled data in parallel form. The ASIC 510 processes and transmits the resulting processed, digitized signal via one or more of ASIC-multiplexer connections 675A, 675B, and 675C to the multiplexer 520. The multiplexer 520 receives the processed, digitized signal and converts it into a serial bit stream. The multiplexer 520 essentially takes parallel words at a given frequency and combines them into a serial bit stream, putting out a serial bit stream that is, for example, sixteen times faster than the input parallel word. If, for example, the processed, digitized signal has a clock rate of approximately 394 MHz in frequency, the multiplexer 515 may transmit a multiplexed signal having a frequency of approximately 16 times 394 MHz, or approximately 6301 MHz.

The multiplexer 515 transmits the multiplexed signal 515 via one or more of multiplexer-amplifier connections 680A, 680B, and 680C to at least one of the one or more amplifiers 530A, 530B, and 530C. The amplifiers 530A, 530B, and 530C provide the ultimate desired signal power levels. The amplifier 530A is operably connected via a first amplifier-filter connection 685A to the first filter 540. The amplifier 530B is operably connected via a second amplifier-filter connection 685B to the second filter 550. The amplifier 530C is operably connected via a third amplifier-filter connection 685C to the third filter 560.

The first filter 540 is operably connected to the combiner 570 via a first filter-combiner connection 690A that transmits an L1 signal. The second filter 550 is operably connected to the combiner 570 via a second filter-combiner connection 690B that transmits an L2 signal. The third filter 560 is operably connected to the combiner 570 via a third filter-combiner connection 690C that transmits an L5 signal. At least one of the first filter 540, the second filter 550, and the third filter 560 is operably connected to the combiner 570; and the combiner 570 is operably connected to the antenna 110 via a single transmission line 695.

At least one of the first filter 540, the second filter 550, and the third filter 560 converts the digital signal to an analog signal, rejecting the quantization noise that lies outside a desired frequency band.

The combiner 570 receives the individual L1, L2, and L5 signals and frequency multiplexes the individual bands onto the single transmission line 695. Upon reception via the single transmission line 695 by the antenna 110, the antenna 110 transmits the combined frequency bands uniformly over the Earth's field of view from the medium earth orbit (MEO) deployed space vehicle comprising the apparatus 600.

At least one of the first filter 540, the second filter 550, and the third filter 560 converts the respective incoming digital signal 685A, 685B, and 685C to the respective filtered analog signal 690A, 690B, and 690C.

Figure 7A:
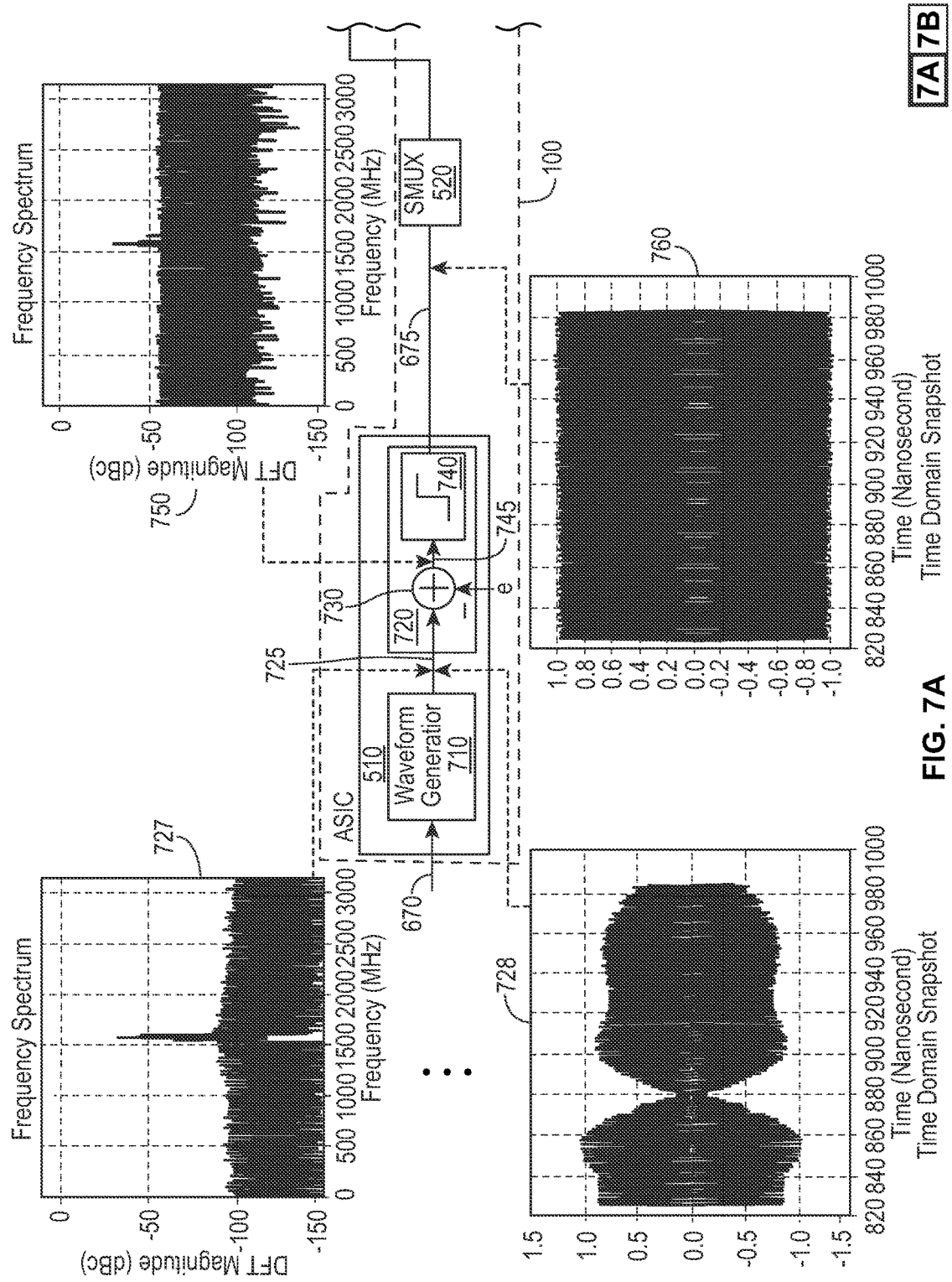
FIGS. 7A-7B are a block diagram of the architecture of an all digital beam forming apparatus, showing exemplary waveforms generated at various points in the process.
Figure 7B:
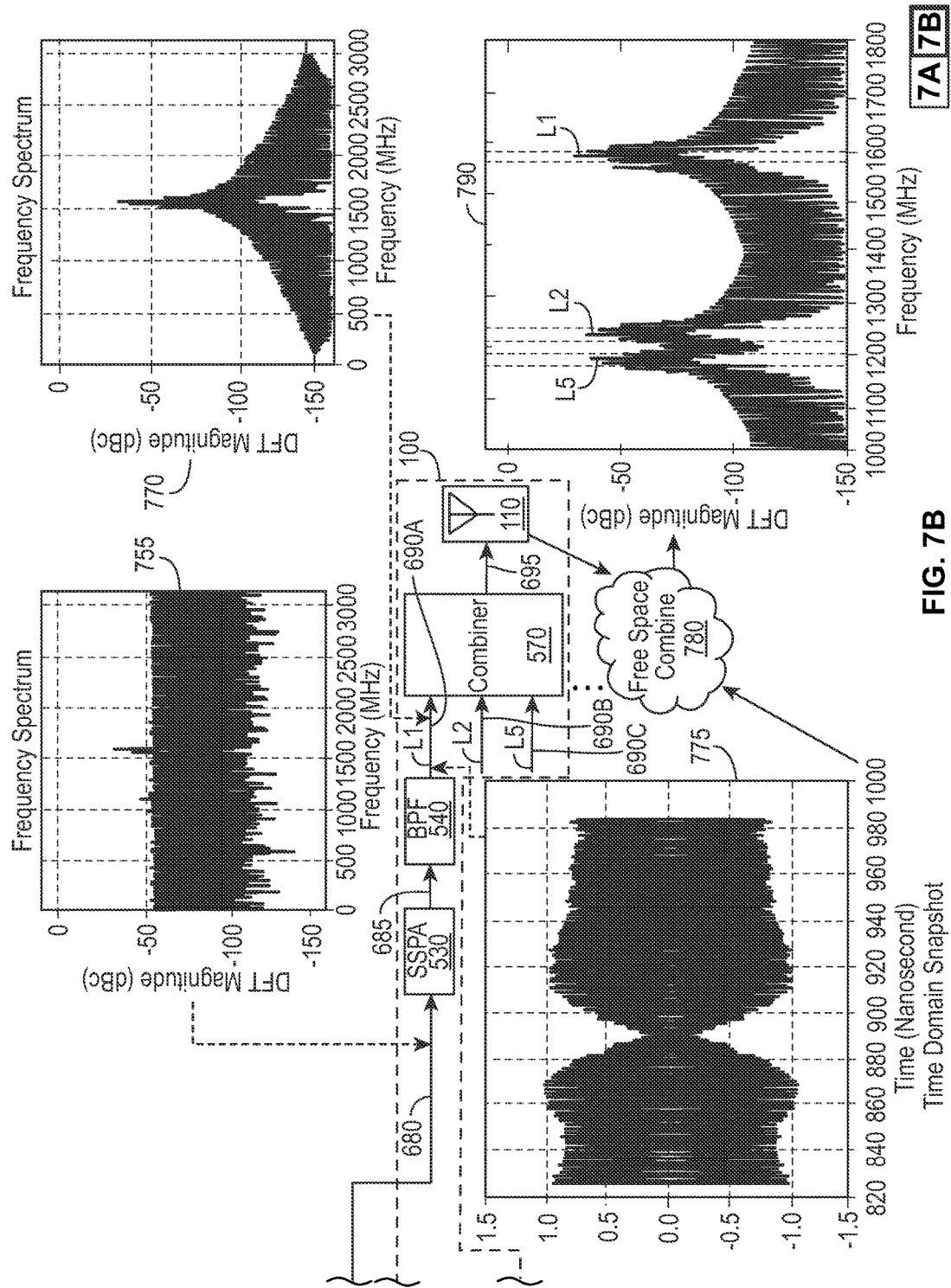

FIGS. 7A-7B are a block diagram 700 of the architecture of an all digital beam forming apparatus 600, showing exemplary waveforms generated at various points in the process. Also provided is further detail regarding the structure of the ASIC 510.

As in FIGS. 5 and 6, the ASIC 510 receives the navigation data via the navigation data repository-ASIC connection 670. The ASIC 510 then produces oversampled data in parallel form. In this more detailed view of the ASIC 510, the ASIC 510 comprises one or more of a digital waveform generator 710 operably connected to a dithering and quantization block 720 via a waveform generator-dithering and quantization connection 725. The digital waveform generator 710 produces a waveform frequency spectrum 727 and a time domain snapshot 728 such as the representative examples depicted in the figure.

The dithering and quantization block 720 in turn comprises one or more of a dithering unit 730 and a quantization unit 740 that is operably connected to the dithering unit 730 via a dithering-quantization connection 745. The dithering unit 730 is configured to generate pseudo-random noise (PRN) codes, thereby randomizing the quantization noise from element to element and improving the effective number of bits (ENoB) precision. The dithering unit 730 produces a dithered frequency spectrum 750 such as the representative example depicted in the figure. Accordingly, independent random quantization noise dithering is performed prior to digital/analog input.

The quantization unit 740 may, as depicted in FIGS. 7A-7B, be configured to perform 1-bit quantization. The quantization unit 740 may be configured to perform N-bit quantization should one bit not prove sufficient or should more bits be desired. The quantization unit 740 produces a quantized spectrum 755 and a quantized time domain snapshot 760 such as the representative examples depicted in the figure.

The quantization unit 740 outputs a quantized signal that is transmitted via the ASIC-multiplexer connection 675 to the multiplexer 520 and then is transmitted via the multiplexer-amplifier connection 680 from the multiplexer 520 to the amplifier 530. The multiplexer 520 does not alter the waveform but essentially takes parallel words at a given frequency and combines them into a serial putting stream, outputting a serial bit stream.

The amplifier 530 is operably connected via the amplifier-filter connection 685 to the filter 540. The filter 540 converts the digital signal to an analog signal, rejecting the quantization noise that lies outside a desired frequency band.

The filter 540 produces a filtered spectrum 770 and a filtered time domain snapshot 775 such as the representative examples depicted in the figure.

As in FIG. 6, the combiner 570 receives the individual filtered analog signals 690A, 690B, and 690C, respectively corresponding to the L1, L2, and L5 bands and frequency multiplexes the individual bands onto the single transmission line 695, via which the signal is transmitted to the antenna 110. The signals of the different DBFEs 100 then losslessly, coherently combine in free space 780, producing a post-free-space-combination spectrum 790 such as the representative example depicted in the figure.

Figure 8:
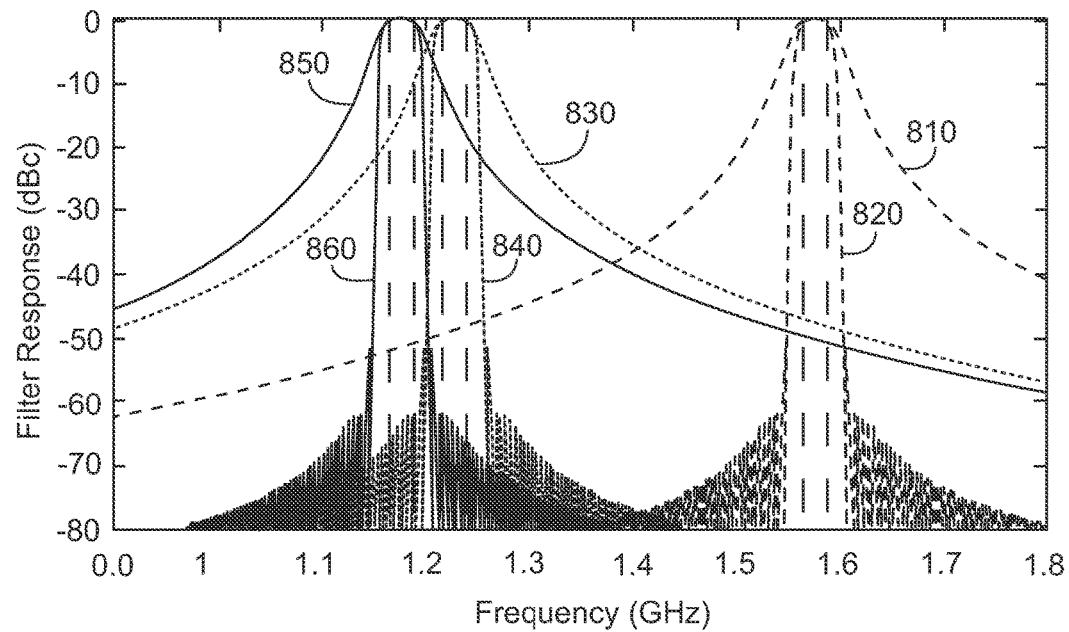
FIG. 8 is a graph of filter response in decibels relative to carrier as a function of frequency.

The PRN codes are broadcast to one or more antennae 110 that contain waveform tables storing the individual samples of the desired communication waveform. The PRN code at each individual ASIC 510 is an index into this waveform table. At the execution of each ASIC 510—clocked at a PRN code rate of approximately 10.23 MHz—a digital representation of the individual symbol is concatenated onto a signal data stream at an over-sampled rate of 6.301 gigabytes per second (Gbps). The digital representations of the individual symbols are digitally filtered using a pre-computed filtering protocol. FIG. 8 below depicts representative digital filter response curves—L1 digital filter response curve 820, L2 digital filter response curve 840, and L5 digital filter response curve 860.

The digital signal stream is added to the random noise dither and quantized into a pulse code modulated N-bit data stream at, for example, 6.301 Gsamples per second. For example, the N-bit data stream is a one-bit data stream. For example, the N-bit data stream is a two-bit data stream. For example, the N-bit data stream is a data stream in which N is an integer larger than two. The addition of the dither signal randomizes the quantization noise from element to element and improves the effective number of bits (ENoB) at the receiver. The waveform table storage and digital processing up to this point is accomplished within the ASIC 510.

Using high-efficiency gallium nitride (GaN) switched amplifier technology, the N-bit data stream is then amplified to power levels up to 20 Watts. The spectrum of this 1-bit quantized data stream includes the modulated PNT signals at the desired power levels, and quantization noise. The out-of-band quantization noise is then rejected with a bandpass reconstruction filter, resulting in the microwave representation of the desired signal, which is combined with adjacent frequency bands and transmitted by the array antenna element. The transmitted signal power is further increased through the lossless, coherent free-space combination of the multiple array transmitted signals, while the residual uncorrelated in-band quantization noise is reduced further through non-coherent averaging. The resulting frequency spectrum after free space combining is shown in FIGS. 7A-7B as item 790.

One significant advantage is the all-digital generation of PNT signals, which is distributed over a phased array aperture. The navigation PRN codes—with navigation data—are broadcasted to an array of DBFEs that contain waveform tables storing the individual symbols of the desired communication constellation. The navigation data at each individual chip is an index into this table. At the execution of each chip—clocked at the navigation rate of 10.23 MHz—a digital representation of the individual symbol is concatenated onto a signal data stream at an oversampled rate of 6.301 Gsps. The digital signal stream is quantized into a pulse code modulated 1-bit data steam at 6.301 Gbps. The waveform table storage and digital processing up to this point is accomplished within the ASIC 510.

The resulting transmitted signal provides a high fidelity representation of the desired combination of individual PNT signals that is particularly insensitive to on-orbit space vehicle temperature variations and end-of-life failures, due to the all-digital representation of the signal generation throughout all the active components and the distributed nature of the phased array 200. The temperatures of the individual DBFEs 100 are monitored and used with a factory-generated calibration table stored within the NEFU 610, providing amplitude and phase correction factors that are applied to the waveform tables loaded into the ASICs 510. These tables are refreshed over a period of a few seconds, which is more than adequate for tracking temperature variations, and provides a mechanism for flushing out errors resulting in a self-healing system. The number of DBFEs 100 is also selected to provide 24 for 27 redundancy at end-of-life. The impact to the signal quality resulting from the failure of 3 DBFEs 100 is minimized through updated waveform table generation and SSPA 530 power level settings. In addition, the all-digital architecture allows for on-orbit reconfigurable signals through updated waveform tables, and the application of regional coverage and power boost also through updated waveform tables and SSPA 530 power level settings. In the case of applying regional coverage, the resulting phased array beam is also kept on the area of operation by the periodic waveform table maintenance updates from the on-board computer.

FIG. 8 is a graph of filter response in decibels relative to carrier (dBc) as a function of frequency. Illustrated are L1 analog filter response curve 810, L1 digital filter response curve 820, L2 analog filter response curve 830, L2 digital filter response curve 840, L5 analog filter response curve 850, and L5 digital filter response curve 860. A comparison of L1 analog filter response curve 810 with digital filter response curve 820, for example, shows the greatly improved performance relative to the prior art of the all-digital beam forming and transmit phased array using direct digital synthesis of discretely modulated waveforms. Similarly greatly improved performance relative to the prior art is evident from a comparison of L2 analog filter response curve 830 with L2 digital filter response curve 840, and from a comparison of L5 analog filter response curve 850 with L2 digital filter response curve 860.

Figure 9:
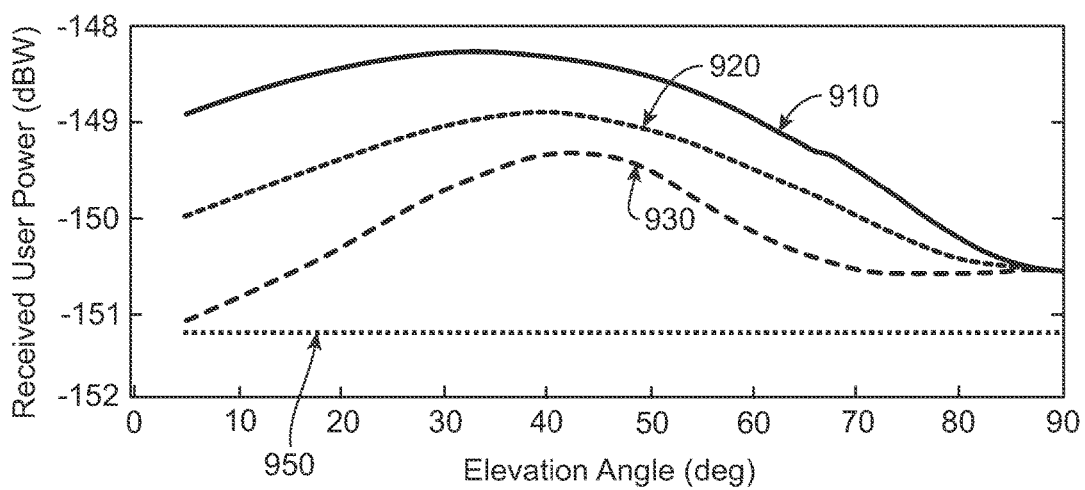
FIG. 9 is a graph of received user power relative to the elevation angle for the L1 link with a five-degree mask angle.

FIG. 9 is a graph of received user power relative to the elevation angle in degrees for the L1 link with a five-degree mask angle. Illustrated are maximum power 910 as a function of elevation angle, mean power 920 as a function of elevation angle, and minimum power 930 as a function of elevation angle. The dotted reference line 950 shows the estimated requirement or specification of approximately −151.2 dBW.

Figure 10:
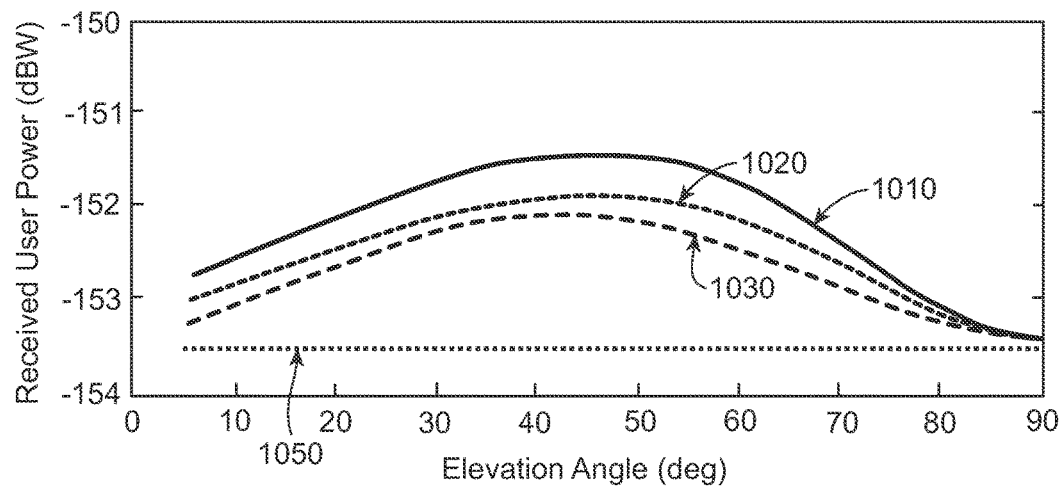
FIG. 10 is a graph of received user power relative to the elevation angle for the L2 link with a five-degree mask angle.

FIG. 10 is a graph of received user power relative to the elevation angle in degrees for the L2 link with a five-degree mask angle. Illustrated are maximum power as a function of elevation angle, mean power as a function of elevation angle, and minimum power as a function of elevation angle. The dotted reference line shows the estimated requirement or specification of approximately −154.0 dBW.

Figure 11:
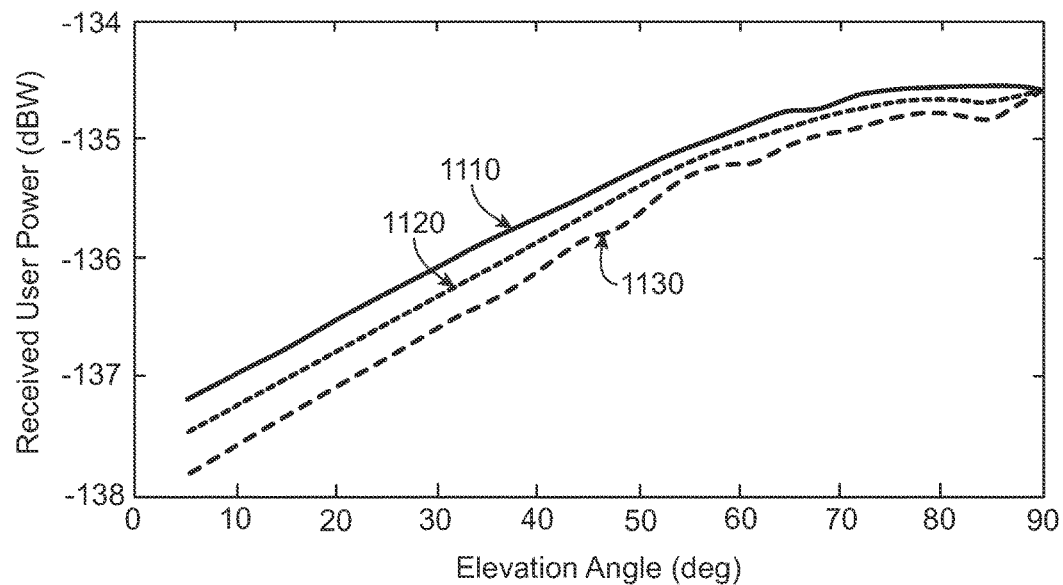
FIG. 11 is a graph of received user power relative to elevation angle for the L1 link for a spot beam at the peak of the beam.

FIG. 11 is a graph of received user power relative to the elevation angle in degrees for the L1 link for a spot beam at the peak of the beam. Illustrated are maximum power 1110 as a function of elevation angle, mean power 1120 as a function of elevation angle, and minimum power 1130 as a function of elevation angle.

Figure 12:
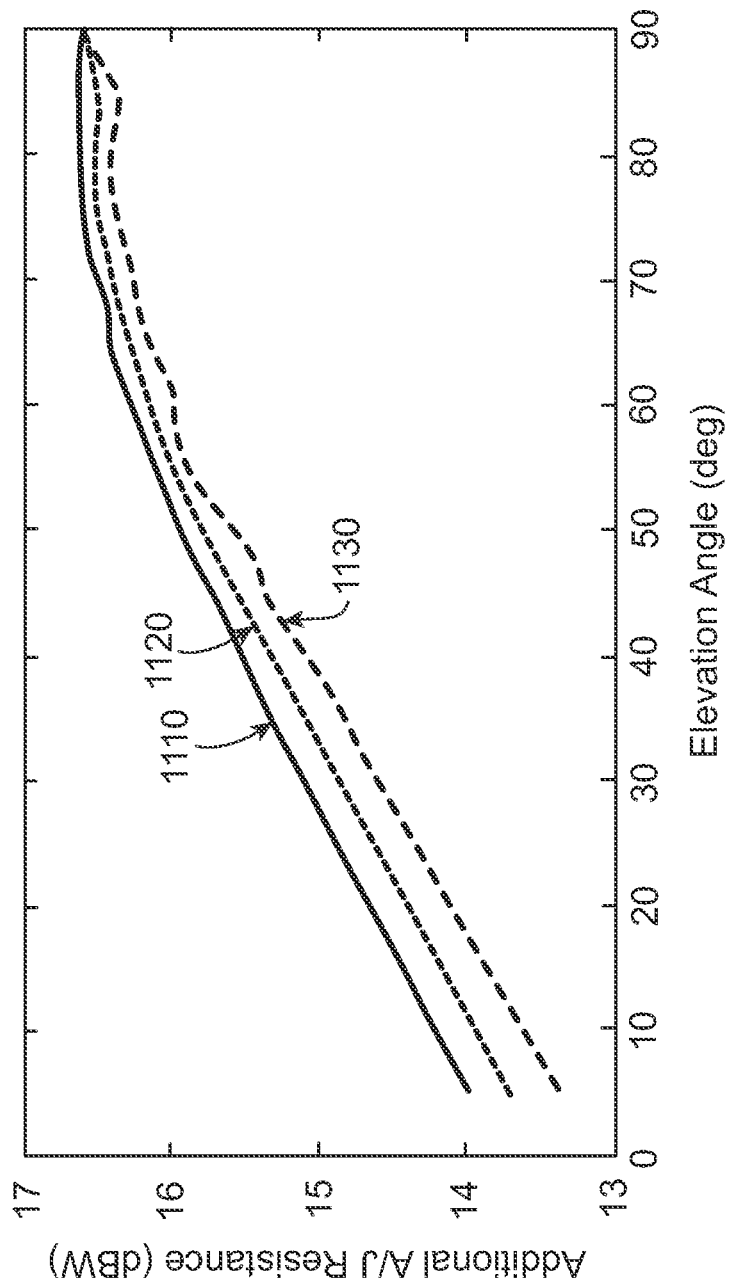
FIG. 12 is a graph of additional anti-jam resistance relative to the elevation angle for the L1 link spot beam, as compared to the prior art.

FIG. 12 is a graph of additional antijam resistance relative to the elevation angle in degrees, for the L1 link spot beam at the peak of the beam, as compared to the prior art. Illustrated are maximum power 1110 as a function of elevation angle, mean power 1120 as a function of elevation angle, and minimum power 1130 as a function of elevation angle.

The figure presents the same curves as in FIG. 11 but the abscissa clarifies the anti-jam resistance advantage offered by embodiments of the invention. Anti-jam resistance can be defined as additional power above what is needed to make the beam function, as any additional power can be applied to combating jamming. This figure demonstrates an advantage of approximately 13 dB for the spot beam relative to the prior art.

According to embodiments of the invention, the digital architecture allows for on-orbit reconfigurable signals through updated waveform tables, and support for regional coverage via one or more of narrower phased array beams, an increase in power, updated waveform tables, and SSPA power level settings. According to further embodiments of the invention, in the case of regional coverage, the resulting phased array beam is also kept on the area of operation by continual waveform table maintenance updates from the NEFU.

According to other embodiments of the invention, a GPS PNT payload may be achieved having one or more of an estimated weight of less than approximately 200 kilograms, an estimated power of less than approximately 650 watts, and an estimated size of less than approximately 6,500 cubic inches (6,500 in$^3$). According to still other embodiments of the invention, there may be provided one or more of on-orbit robustness, an all-digital architecture, and graceful degradation of a distributed phased array aperture.

According to further embodiments of the invention, an apparatus configured to provide all-digital, high fidelity generation of PNT signals is provided. According to other embodiments of the invention, an apparatus is provided conferring one or more of increased stability and increased tolerance of signals over one or more of temperature gradations and end-of-life failures.

Embodiments of the invention provide one-bit digital-to-analog conversion of a streaming digital representation of the microwave signal.

According to other embodiments of the invention, a compact payload aperture is provided that is reduced in height relative to the current state of the art by approximately ten inches.

According to further embodiments of the invention, an individual element handles less power. According to yet other embodiments of the invention, modular array elements allows for scaling of the array aperture as required.

According to yet other embodiments of the invention, the amplifier amplifies digital pulse-encoded signals prior to reconstruction by the filters to achieve a power-added efficiency (PAE) at the device of greater than approximately 50%. Embodiments of the invention permit use of SSPAs providing less than approximately twenty watts (20 W) in contrast to prior art requirements of high power amplifiers providing greater than approximately 100 W. Further embodiments of the invention provide an overall RF power efficiency from primary bus power to transmitted RF power of approximately 45% compared to the prior art's efficiency of approximately 30%.

Other embodiments of the invention provide at least 13 dB of increased equivalent isotropically radiated power (EIRP) at the center of the beam for the GPS receiver. The half-power beam width (HPBW) is approximately eleven degrees.

Yet other embodiments of the invention provide for transmission and reception via the same aperture. Further embodiments of the invention provide a digital architecture with one or more of a stable signal phase, a stable signal amplitude, and thermal insensitivity.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention. For example, there may be more than three amplifiers comprised in a DBFE. For example, fewer than three amplifiers may be comprised in a DBFE. For example, the amplifiers may be another type of amplifiers other than SSPA's. For example, the filters may be another type of filters other than bandpass filters. For example, there may be more than three filters comprised in a DBFE. For example, there may be fewer than three filters comprised in a DBFE. For example, the different antennae comprised in a given phased array may have more than one aperture design.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

We claim:

1. An apparatus comprising:
   a Global Positioning System (GPS) phased array comprising:
   1) a plurality of digital beam forming elements (DBFEs), wherein each of the DBFEs comprises:
      a) an antenna configured to transmit a GPS signal;
      b) a radio frequency (RF) electronics section operably connected to the antenna, wherein the RF electronics section comprises:
         i) a plurality of digital amplifiers receiving a respective serial bit stream;
         ii) a plurality of filters operably connected to a respective digital amplifier, the filters converting a digital signal output from the respective digital amplifiers to an analog signal, and
         iii) an analog combiner operably connected between the filters and the antenna; and
      c) a digital electronics section operably connected to the RF electronics section, wherein the digital electronics section comprises:
         i) a digital application-specific integrated circuit (ASIC), wherein the ASIC comprises a digital waveform generator, a quantization unit configured to perform N-bit quantization, and a dithering unit configured to generate pseudo-random noise (PRN) codes; and
         ii) a digital multiplexer operably connected to the ASIC, the digital multiplexer providing the respective serial bit stream, the GPS phased array further comprising:
   2) a navigation encoder and frequency generator (NEFU) unit comprising:
      a) a navigation data repository operably connected to the ASIC; and
      b) a frequency synthesizer operably connected to the ASIC; and
   3) an atomic frequency standard operably connected to the frequency synthesizer.

2. The apparatus of claim 1, wherein the analog combiner frequency multiplexes individual bands onto a single transmission line.

3. The apparatus of claim 1, wherein the quantization unit is configured to perform one-bit quantization.

4. The apparatus of claim 1, wherein the quantization unit is configured to perform N-bit quantization, wherein N is an integer equal to two or more.

5. The apparatus of claim 1, wherein the multiplexer comprises a Serial Multiplexing (SMUX) unit.

6. The apparatus of claim 1, wherein the multiplexer comprises a digital SMUX unit.

7. The apparatus of claim 1, wherein the analog combiner is operably connected to the antenna.

8. The apparatus of claim 1, wherein one or more of the one or more filters comprises a bandpass filter (BPF).

9. The apparatus of claim 8, wherein one or more of the one or more filters comprises a microwave BPF.

10. The apparatus of claim 1, wherein one or more of the one or more filters is configured to convert the signal from digital to analog.

11. The apparatus of claim 1, wherein one or more of the one or more digital amplifiers comprises a solid state power amplifier (SSPA).

12. The apparatus of claim 11, wherein one or more of the one or more digital amplifiers comprises a high-efficiency SSPA.

13. The apparatus of claim 1, wherein one or more of the one or more digital amplifiers comprises a direct current (DC) power converter.

14. The apparatus of claim 1, wherein the antenna comprises a generally helical aperture.

15. The apparatus of claim 1, wherein the antenna comprises a generally conical aperture.

16. The apparatus of claim 1, wherein the antenna comprises a dual-band stacked patch aperture.

17. The apparatus of claim 1, wherein the dimensions of the phased array are approximately one meter by one meter.

18. The apparatus of claim 1, wherein the phased array comprises approximately twenty-seven DBFEs.

19. The apparatus of claim 1, wherein the ASIC is configured to upload Previously Presented waveforms from the NEFU while in orbit.

20. The apparatus of claim 1, wherein the frequency synthesizer is configured to multiply a reference frequency up to one or more desired transmitted carrier frequencies.

21. The apparatus of claim 20, wherein the one or more desired transmitted carrier frequencies comprise one or more of 1,575.42 MHz for L1, 1,227.6 MHz for L2, and 1,176.45 MHz for L5.

* * * * *